United States Patent  (10) Patent No.: US 11,119,200 B2
Ishikawa et al.  (45) Date of Patent: Sep. 14, 2021

(54) OBJECT DETECTION APPARATUS, OBJECT DETECTION METHOD, AND COMPUTER READABLE MEDIUM

(71) Applicant: MITSUBISHI ELECTRIC CORPORATION, Tokyo (JP)

(72) Inventors: Kentaro Ishikawa, Tokyo (JP); Shu Murayama, Tokyo (JP); Takefumi Hasegawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 172 days.

(21) Appl. No.: 16/603,140

(22) PCT Filed: Jun. 1, 2017

(86) PCT No.: PCT/JP2017/020433
§ 371 (c)(1),
(2) Date: Oct. 4, 2019

(87) PCT Pub. No.: WO2018/220784
PCT Pub. Date: Dec. 6, 2018

(65) Prior Publication Data
US 2020/0116845 A1  Apr. 16, 2020

(51) Int. Cl.
*G01S 7/537* (2006.01)
*G01S 7/52* (2006.01)
(Continued)

(52) U.S. Cl.
CPC .......... *G01S 7/537* (2013.01); *G01S 7/52001* (2013.01); *G06K 9/00805* (2013.01); *H04K 3/222* (2013.01); *H04K 2203/22* (2013.01)

(58) Field of Classification Search
CPC ...... G01S 7/537; G01S 7/52001; G01S 15/86; G01S 15/931; G06K 9/00805; H04K 3/222; H04K 2203/22
See application file for complete search history.

(56) References Cited

U.S. PATENT DOCUMENTS

2020/0116845 A1*  4/2020  Ishikawa .................. G01S 7/537
2020/0271767 A1*  8/2020  Hustava .................... G01S 7/527

FOREIGN PATENT DOCUMENTS

CN  110419211 A  * 11/2019  ........... G08G 1/0145
CN  110678775 A  *  1/2020  ......... G01S 7/52001
(Continued)

OTHER PUBLICATIONS

International Search Report (PCT/ISA/210) issued in PCT/JP2017/020433, dated Aug. 22, 2017.

*Primary Examiner* — Daniel Pihulic
(74) *Attorney, Agent, or Firm* — Birch, Stewart, Kolasch & Birch, LLP

(57) ABSTRACT

A reception unit receives, with an ultrasonic sensor, received signals including a reflected wave obtained when an acoustic signal emitted from a mobile body is reflected by an object. A disturbance judgment unit judges whether a jamming attack in which a jamming signal is transmitted from outside is being made, on the basis of the received signals. An object detection unit detects an object in surroundings of the mobile body on the basis of the received signals if it is judged that no attack is being made and does not perform object detection if it is judged that an attack is being made.

10 Claims, 15 Drawing Sheets

(51) Int. Cl.
*G06K 9/00* (2006.01)
*H04K 3/00* (2006.01)

(56) References Cited

FOREIGN PATENT DOCUMENTS

| DE | 112017007050 T5 | * | 10/2019 | ............ G08G 1/146 |
| DE | 112017007495 T5 | * | 1/2020 | ............ H04K 3/222 |
| JP | 6-186327 A | | 7/1994 | |
| JP | 2003-43138 A | | 2/2003 | |
| JP | 2009-300210 A | | 12/2009 | |
| JP | 5992574 B1 | | 9/2016 | |
| WO | WO-2018167891 A1 | * | 9/2018 | ............ G08G 1/005 |
| WO | WO-2018220784 A1 | * | 12/2018 | ........... G01S 15/931 |

* cited by examiner

OBJECT DETECTION APPARATUS, OBJECT DETECTION METHOD, AND COMPUTER READABLE MEDIUM

TECHNICAL FIELD

The present invention relates to a technique for detecting an object in the surroundings of a mobile body using an acoustic signal.

BACKGROUND ART

Automobiles having a function of detecting an obstacle or the like by sensing surroundings with various sensors and assisting a driver are beginning to be put to practical use. Such automobiles are expected to become globally popular. Along with the popularization, the act of disturbing a sensor function may be performed out of some spite or interest.

Acts of disturbance to a sensor include not only the act of physically destroying the sensor but also the act of emitting a signal of some kind from outside to prevent the sensor from functioning normally.

Examples of a sensor include an ultrasonic sensor which is widely prevalent due to its relatively inexpensive price. An ultrasonic sensor measures the distance to an obstacle and a position or a direction from a time period required for transmission and reception by periodically emitting a transmitted signal, such as a pulse signal, and receiving a reflected wave from the obstacle. When a high-power sinusoidal (or pulse) signal which has the same frequency as a transmitted signal and an almost constant amplitude is emitted as a jamming signal from outside, a reflected wave is obscured to prevent accurate measurement. For this reason, if a jamming attack that emits a jamming signal is made, it is necessary to take an action to warn a driver or interrupt sensor-based driving assistance in order to ensure the safety of the driver.

Patent Literatures 1 and 2 each describe a method for judging an environment in the surroundings of a vehicle using an acoustic signal.

Patent Literature 1 describes inhibiting false detection by setting a detection threshold such that the detection threshold decreases with increase in the distance to an object to be detected. Patent Literature 2 describes judging, from variation in peak position and peak amplitude among received signals, whether an environment that a vehicle is in is a particular environment, such as the interior of a tunnel.

CITATION LIST

Patent Literature

Patent Literature 1: JP 2009-300210
Patent Literature 2: JP 2016-206011

SUMMARY OF INVENTION

Technical Problem

The technique described in Patent Literature 1 is for adjusting the sensitivity of a sensor on the basis of a maximum amplitude value for received signals. In the case of a jamming signal which continuously emits a sinusoidal (or pulse) signal with an almost constant amplitude, even if the sensitivity is adjusted by the method, a peak of the jamming signal is falsely detected.

The method described in Patent Literature 2 is for judging a particular environment from variation in peak among received signals. In the case of a jamming signal which continuously has an almost constant amplitude, the method falsely detects the jamming signal indicating a particular environment or an object.

This invention has as its object to prevent false detection based on a jamming signal and enhance the safety of a mobile body, such as an automobile.

Solution to Problem

An object detection apparatus according to the present invention includes:

a reception unit to receive, with a reception apparatus provided in a mobile body, received signals including a reflected wave obtained when an acoustic signal emitted from the mobile body is reflected by an object;

a disturbance judgment unit to judge whether a jamming attack in which a jamming signal is transmitted from outside is being made, on the basis of the received signals received by the reception unit; and an object detection unit to detect an object in surroundings of the mobile body on the basis of the received signals if it is judged by the disturbance judgment unit that no jamming attack is being made.

Advantageous Effects of Invention

According to this invention, an object is detected if it is judged that no jamming signal is being transmitted. It is thus possible to prevent false detection based on a jamming signal and enhance the safety of a mobile body.

DESCRIPTION OF EMBODIMENTS

Embodiment 1

*Description of Configuration*

Figure 1:
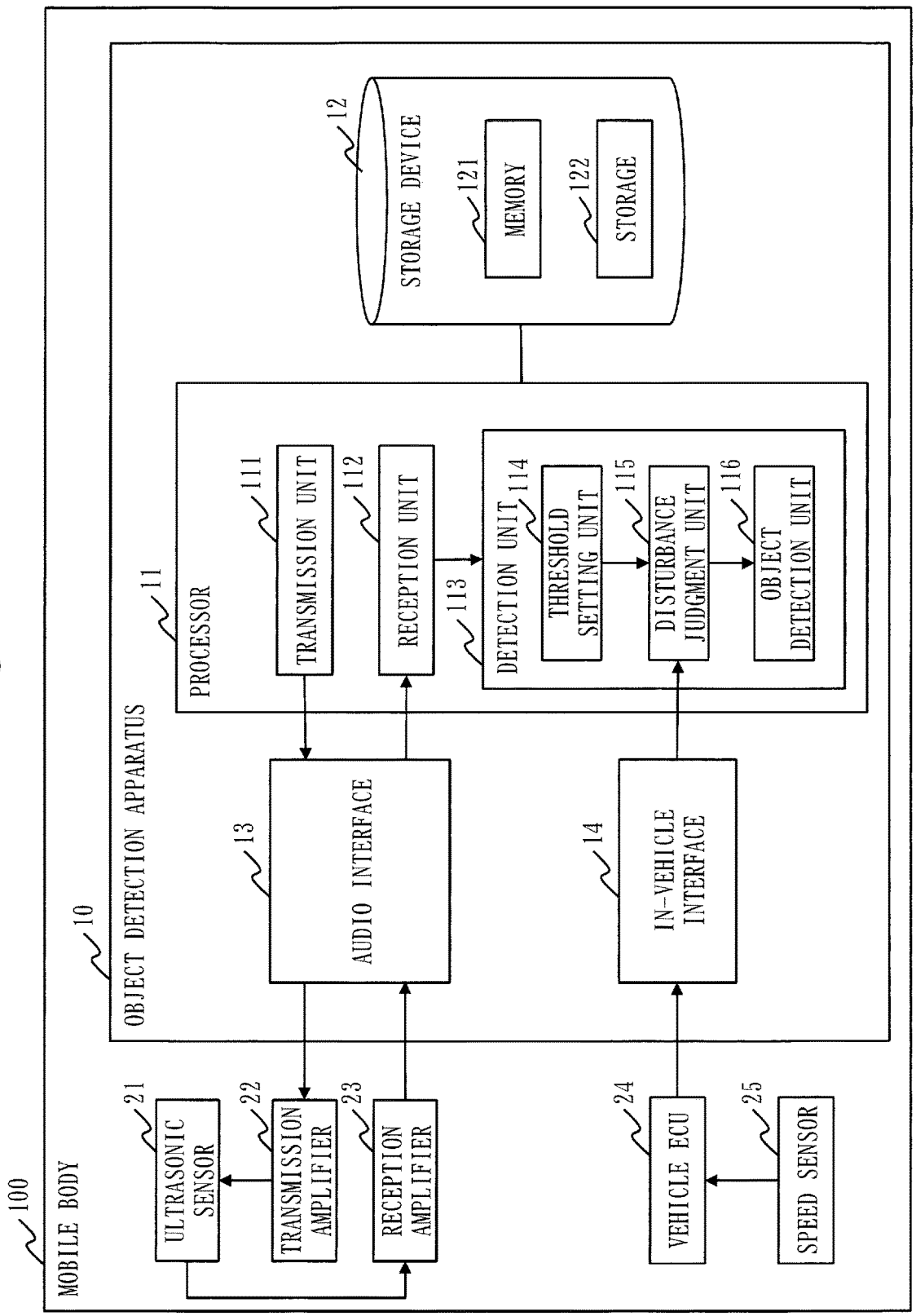
FIG. 1 is a diagram of a configuration of an object detection apparatus 10 according to Embodiment 1.

A configuration of an object detection apparatus 10 according to Embodiment 1 will be described with reference to FIG. 1.

The object detection apparatus 10 is a computer which is mounted on a mobile body 100. Embodiment 1 will be described on the assumption that the mobile body 100 is a vehicle. The mobile body 100, however, may be another type, such as a ship.

Note that the object detection apparatus 10 may be implemented in a form integrated with or inseparable from the mobile body 100 or another component shown or may be implemented in a form removable from or separable from the mobile body 100 or another component shown.

The object detection apparatus 10 includes pieces of hardware, such as a processor 11, a storage device 12, an audio interface 13, and an in-vehicle interface 14. The processor 11 is connected to the other pieces of hardware via a system bus and controls the other pieces of hardware.

The processor 11 is an IC (Integrated Circuit) which performs processing. A concrete example of the processor 11 is a CPU (Central Processing Unit), a DSP (Digital Signal Processor), or a GPU (Graphics Processing Unit).

The storage device 12 includes a memory 121 and a storage 122. A concrete example of the memory 121 is a RAM (Random Access Memory). A concrete example of the storage 122 is an HDD (Hard Disk Drive). The storage 122 may be a portable storage medium, such as an SD (Secure Digital) memory card, a CF (CompactFlash), a NAND flash, a flexible disk, an optical disc, a compact disc, a Blu-ray (registered trademark) Disc, or a DVD.

The audio interface 13 is a device for connecting a transmission amplifier 22 and a reception amplifier 23 which are connected to an ultrasonic sensor 21 mounted on the mobile body 100 to the system bus via an audio bus. A concrete example of the audio interface 13 is a USB (Universal Serial Bus), IEEE1394, or HDMI (registered trademark; High-Definition Multimedia Interface) terminal.

The ultrasonic sensor 21 is an apparatus which emits a transmitted signal as an acoustic signal to outside and receives a received signal as an acoustic signal from outside. The ultrasonic sensor 21 is an example of a reception apparatus. The transmission amplifier 22 is an apparatus which amplifies a transmitted signal as an acoustic signal and transmits the transmitted signal to the ultrasonic sensor 21. The reception amplifier 23 is an apparatus which amplifies a received signal as an acoustic signal received by the ultrasonic sensor 21.

The in-vehicle interface 14 is a device for connecting a vehicle ECU 24 which is mounted on the mobile body 100 to the system bus via an in-vehicle bus. A concrete example of the in-vehicle interface 14 is a USB, IEEE1394, or HDMI (registered trademark) terminal. A concrete example of the in-vehicle bus is CAN (Control Area Network).

The vehicle ECU 24 is connected to an apparatus, such as a speed sensor 25, and is an apparatus which acquires information on, for example, the speed of the mobile body 100 from the apparatus, such as the speed sensor 25.

The object detection apparatus 10 includes, as functional components, a transmission unit 111, a reception unit 112, and a detection unit 113. The detection unit 113 includes a threshold setting unit 114, a disturbance judgment unit 115, and an object detection unit 116.

Functions of the functional components, the transmission unit 111, the reception unit 112, the detection unit 113, the threshold setting unit 114, the disturbance judgment unit 115, and the object detection unit 116, are implemented by software. A program which implements the functions of the functional components to be implemented by software is stored in the storage 122 of the storage device 12. The program is loaded into the memory 121 by the processor 11 and is executed by the processor 11.

Although FIG. 1 shows only one processor 11, a plurality of processors 11 may be provided. The plurality of processors 11 may execute the program that implements the functions in cooperation with one another.

*Description of Operation*

Operation of the object detection apparatus 10 according to Embodiment 1 will be described with reference to FIGS. 2 to 12.

The operation of the object detection apparatus 10 according to Embodiment 1 corresponds to an object detection method according to Embodiment 1. The operation of the object detection apparatus 10 according to Embodiment 1 also corresponds to processing by an object detection program according to Embodiment 1.

The operation of the object detection apparatus 10 according to Embodiment 1 will be described with reference to FIG. 2.

An object detection process is repeatedly executed at intervals of a fixed time period.

(Step ST11: Emission Process)

The transmission unit 111 regards a pulse signal as a transmitted signal and emits a transmitted signal as an acoustic signal at even intervals from the ultrasonic sensor 21 via the transmission amplifier 22.

The transmission unit 111 here controls a time for emission of a transmitted signal and transmission output power. Times need not be evenly spaced and may be changed in accordance with, for example, the status of the mobile body 100. The status of the mobile body 100 is stopped, running at low speed, or running at high speed, for example. A time segment during which a transmitted signal is not transmitted may be present.

A transmitted signal is not limited to a pulse signal and may be a sinusoidal signal or the like. The type of a transmitted signal is determined by the specification of the ultrasonic sensor 21.

(Step ST12: Reception Process)

The reception unit 112 receives an acoustic signal, which is a mixture of noise and a reflected wave obtained when the transmitted signal as the acoustic signal is reflected by an object in the surroundings of the mobile body 100, as a received signal with the ultrasonic sensor 21 via the reception amplifier 23. The reception unit 112 writes the received signal received to the memory 121.

When received signals for a reference time period are accumulated in the memory 121, the reception unit 112 outputs the accumulated received signals to the detection unit 113. The reference time period here refers to a time period from a time of transmission of the transmitted signal to a time of transmission of a next transmitted signal or a time period for each phase (to be described later). A time at which received signal storage is started needs to be synchronized with a time at which transmitted signal transmission is started.

(Step ST13: Detection Process)

The detection unit 113 detects a reflected wave from among the received signals output in step ST12. The detection unit 113 calculates a relative distance to the object from a temporal difference between the start of the transmission and reception of the reflected wave. The detection unit 113 is also capable of identifying the position of the object from an emission direction of the transmitted signal and the relative distance.

Operation of the detection unit 113 according to Embodiment 1 will be described with reference to FIG. 3.

Figure 2:
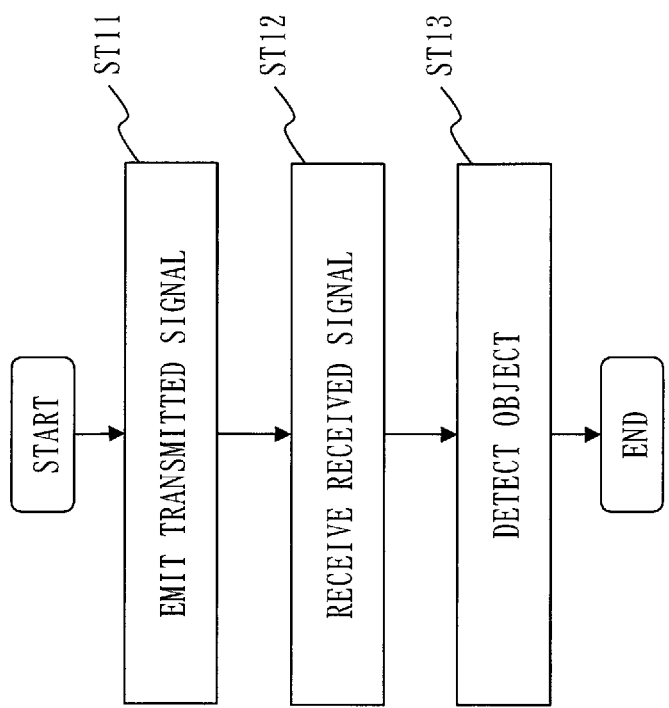
FIG. 2 is a flowchart showing operation of the object detection apparatus 10 according to Embodiment 1.

The operation of the detection unit 113 corresponds to the detection process in step ST13 of FIG. 2. The detection process is executed for each block.

A block according to Embodiment 1 will be described with reference to FIGS. 4 and 5.

Figure 4:
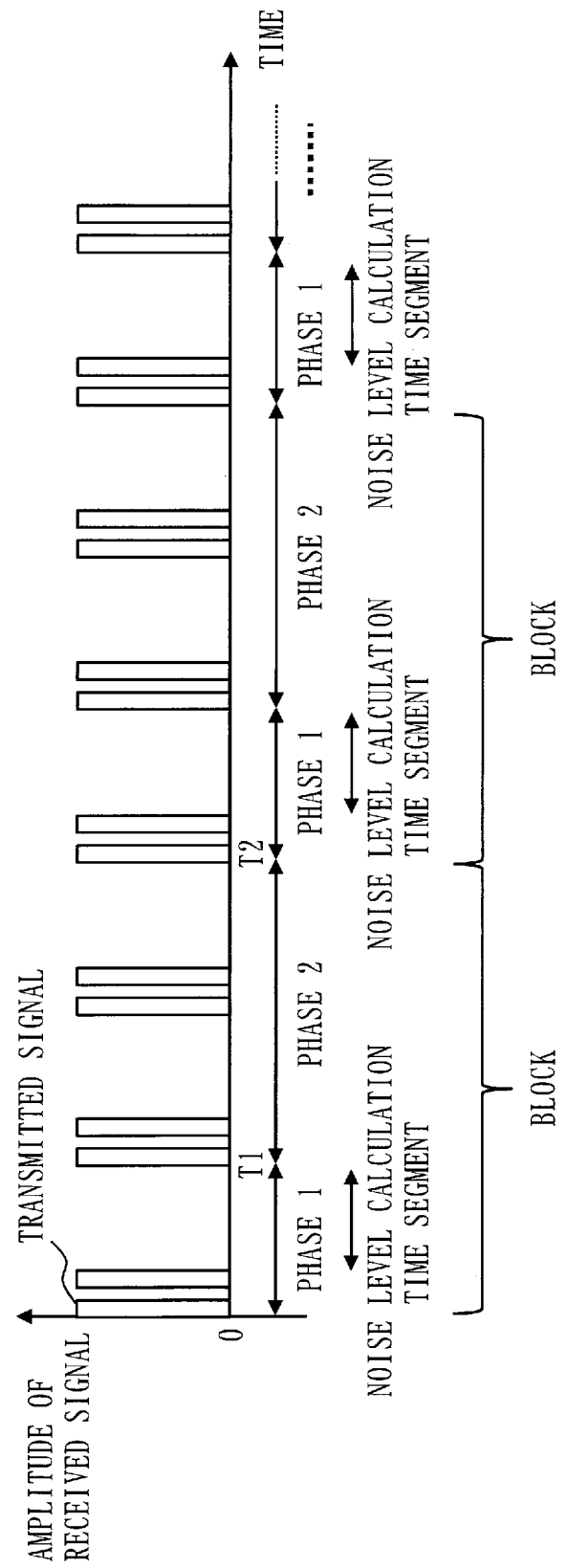
FIG. 4 is a chart for explaining a block according to Embodiment 1.
Figure 5:
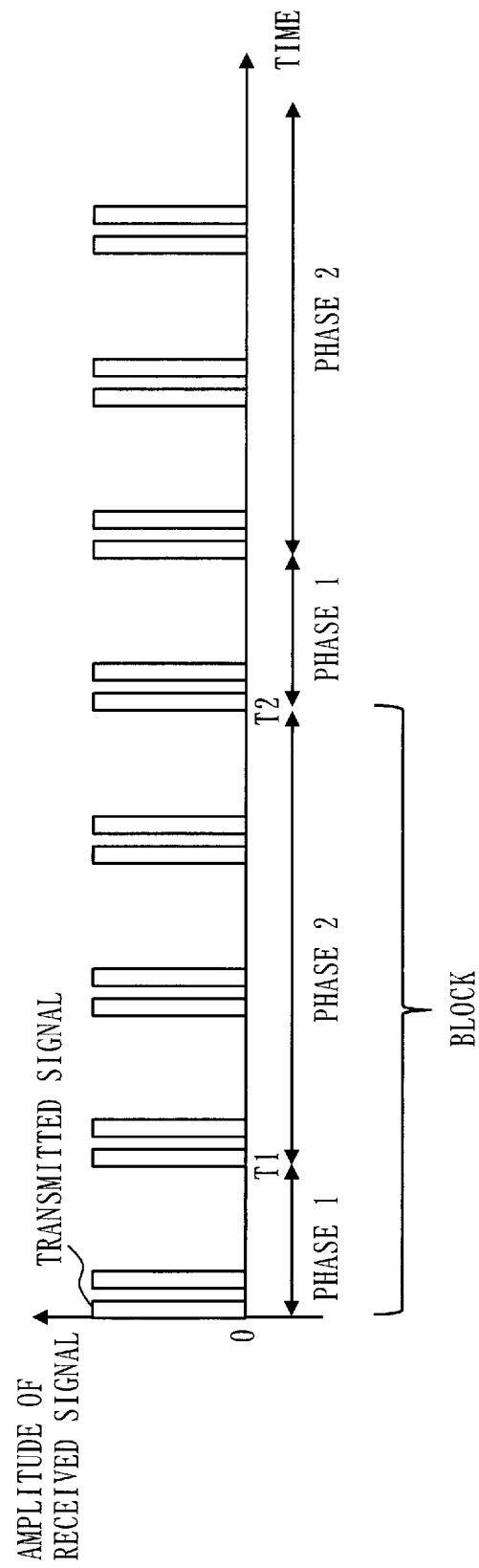
FIG. 5 is a chart for explaining a block according to Embodiment 1.

As shown in FIGS. 4 and 5, each block is composed of phase 1 and phase 2 which is a time slot subsequent to phase 1. Phase 1 is a time slot from time 0 (=time T2) to time T1. Phase 2 is a time slot from time T1 to time T2.

The length of phase 1 (T1-0) and the length of phase 2 (T2-T1) need not be the same. In each of phases 1 and 2, a transmitted signal may be emitted a plurality of times. In FIG. 4, a transmitted signal is emitted once in phase 1, and a transmitted signal is emitted twice in phase 2. In contrast, in FIG. 5, a transmitted signal is emitted once in phase 1, and a transmitted signal is emitted three times in phase 2. As described above, the number of times a transmitted signal is emitted is not particularly limited.

(Step ST21: Threshold Setting Process)

The threshold setting unit 114 calculates received signal noise level using received signals received in phase 1 among the received signals output in step ST12. The threshold setting unit 114 sets a threshold Y0 in accordance with the calculated noise level. The threshold setting unit 114 outputs the set threshold Y0 to the disturbance judgment unit 115.

The noise level is prescribed on the basis of a yardstick, such as an average value, a median, a maximum value, a variance, or a standard deviation for the received signals. The threshold Y0 may be the noise level itself or a value obtained by multiplying the noise level by an arbitrary coefficient. The threshold Y0 is desirably set to be moderately high in order to inhibit a peak of noise from being falsely detected as a peak of a reflected wave from an object.

Figure 6:
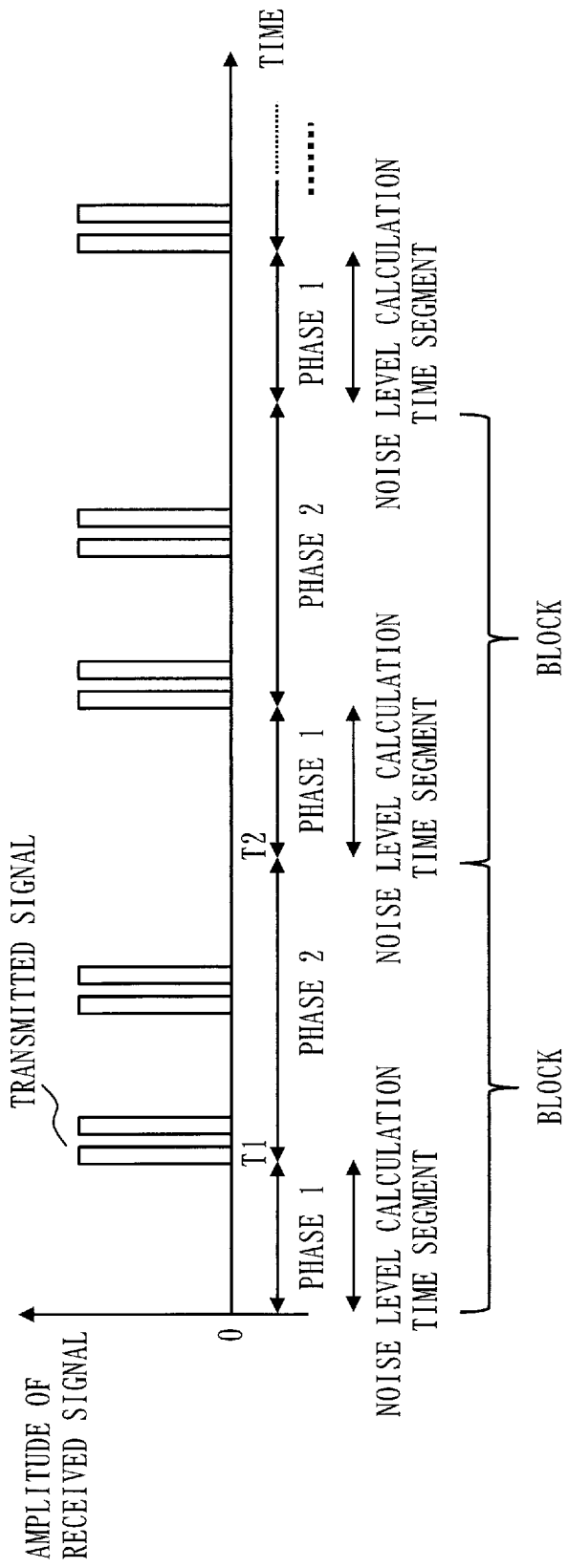
FIG. 6 is a chart for explaining a block according to Embodiment 1.

The threshold setting unit 114 calculates the noise level using received signals in phase 1 except a time slot (dead zone), during which a transmitted signal is emitted. If no transmitted signal is emitted in phase 1, as shown in FIG. 6, the noise level is calculated on the basis of the received signals received over the whole of phase 1.

(Step ST22: Disturbance Judgment Process)

The disturbance judgment unit 115 judges whether a jamming attack that transmits a jamming signal from outside is being made, on the basis of received signals received in phase 2 among the received signals output in step ST12, the threshold Y0 set in step ST21, and the speed of the mobile body 100 detected by the speed sensor 25. The disturbance judgment unit 115 outputs a result of the judgment, the received signals received in phase 2, and the threshold Y0 to the object detection unit 116.

If a jamming attack is being made, the disturbance judgment unit 115 advances the process to step ST23. On the other hand, if no jamming attack is being made, the disturbance judgment unit 115 advances the process to step ST24.

Figure 7:
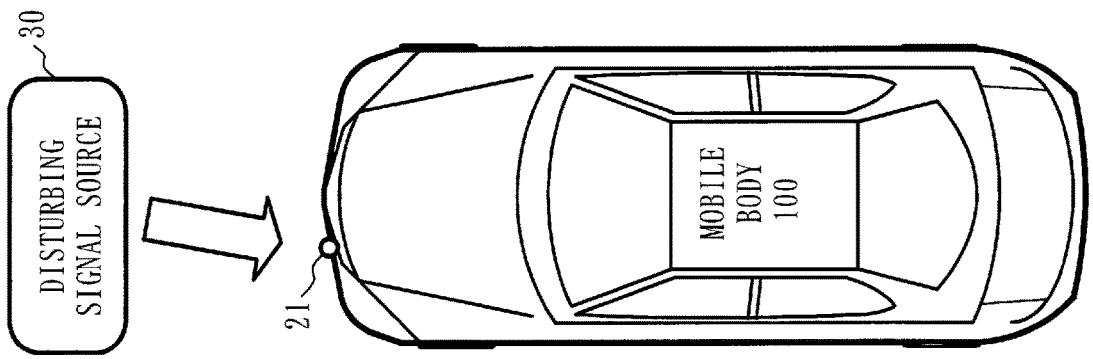
FIG. 7 is a view for explaining a disturbing signal source 30 according to Embodiment 1.

As shown in FIG. 7, a jamming signal is transmitted from a disturbing signal source 30. The disturbing signal source 30 is, for example, an ultrasonic signal generation apparatus which is arranged in a vehicle running in front of the mobile body 100, an ultrasonic signal generation apparatus which is arranged on a road side, or an ultrasonic signal generation, apparatus which is arranged somewhere in the mobile body 100. Although the ultrasonic sensor 21 is arranged at the front of the mobile body 100 in FIG. 7, the ultrasonic sensor 21 may be located at the rear, at a side, at the right or left side of the front, at the right or left side of the rear, on an upper surface, or on a lower surface of the mobile body 100.

(Step ST23: Disturbance Coping Process)

The object detection unit 116 does not perform object detection and takes some action.

As a concrete example, the object detection unit 116 takes an action to notify a driver that object detection is not performed or interrupt sensor-based driving assistance. A coping method is not limited to these, and a coping method conceivable by those skilled in the art may be appropriately selected.

(Step ST24: Object Detection Process)

The object detection unit 116 performs object detection on the basis of the received signals and the threshold Y0 output in step ST22.

More specifically, the object detection unit 116 measures the distance to the object from a time period from the emission of the transmitted signal to reception of a received signal peak.

Operation of the disturbance judgment unit 115 according to Embodiment 1 will be described with reference to FIG. 8.

Figure 3:
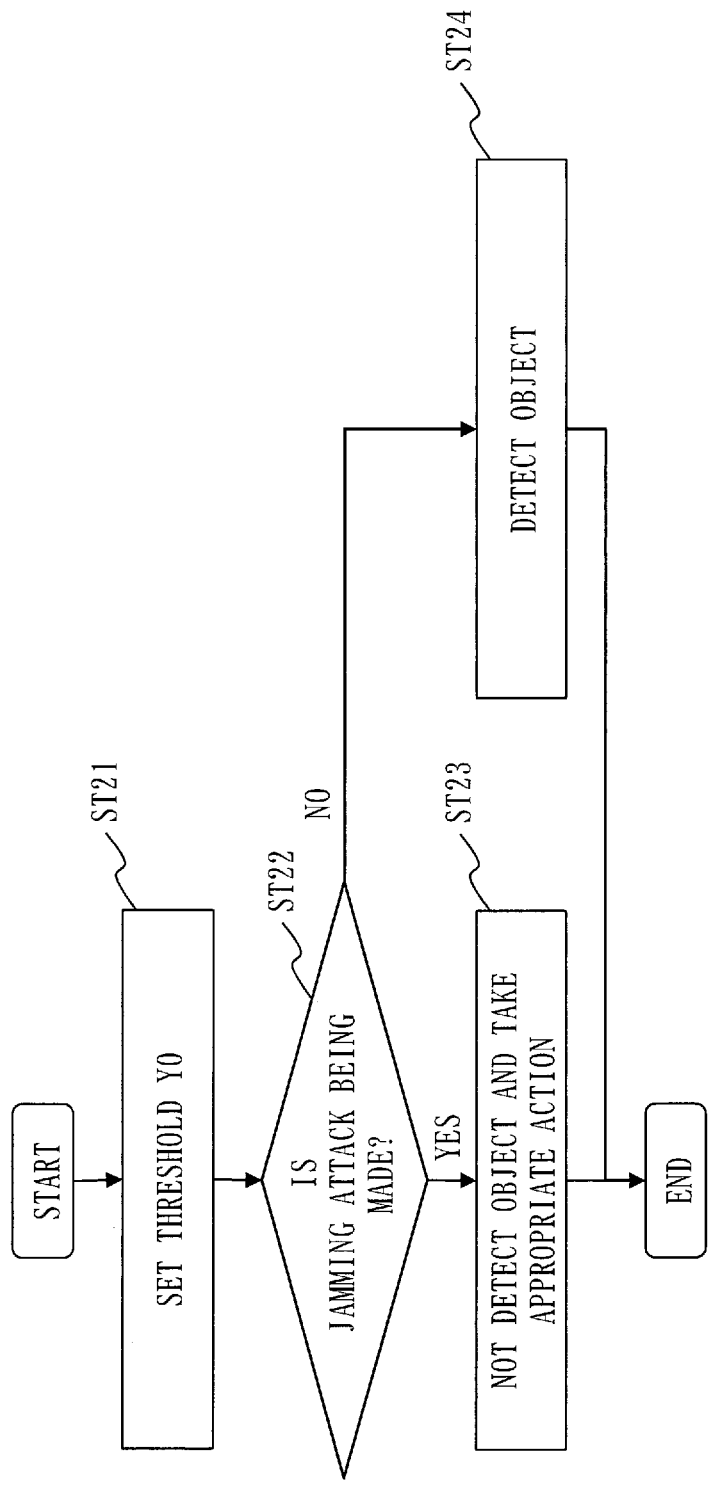
FIG. 3 is a flowchart showing operation of a detection unit 113 according to Embodiment 1.

The operation of the disturbance judgment unit 115 corresponds to the disturbance judgment process in step ST32 of FIG. 3.

(Step ST31: First Judgment Process)

The disturbance judgment unit 115 calculates an envelope curve for the received signals received in phase 2. The disturbance judgment unit 115 judges whether a degree of fluctuation of the envelope curve is equal to or less than a reference value Y1.

The degree of fluctuation here is a variance for an envelope curve y(t) (t=0, 1, 2, . . . , N−1) for the received signals, as indicated by formula 1. Here, μ is an average value for the envelope curve y(t).

$$V(y) = \frac{1}{N}\sum_{t=0}^{N-1}(y(t)-\mu)^2 \qquad \text{[FORMULA 1]}$$

If the degree of fluctuation is equal to or less than the reference value Y1, the disturbance judgment unit 115 advances the process to step ST32. On the other hand, if the degree of fluctuation is more than the reference value Y1, the disturbance judgment unit 115 advances the process to step ST33.

Figure 9:
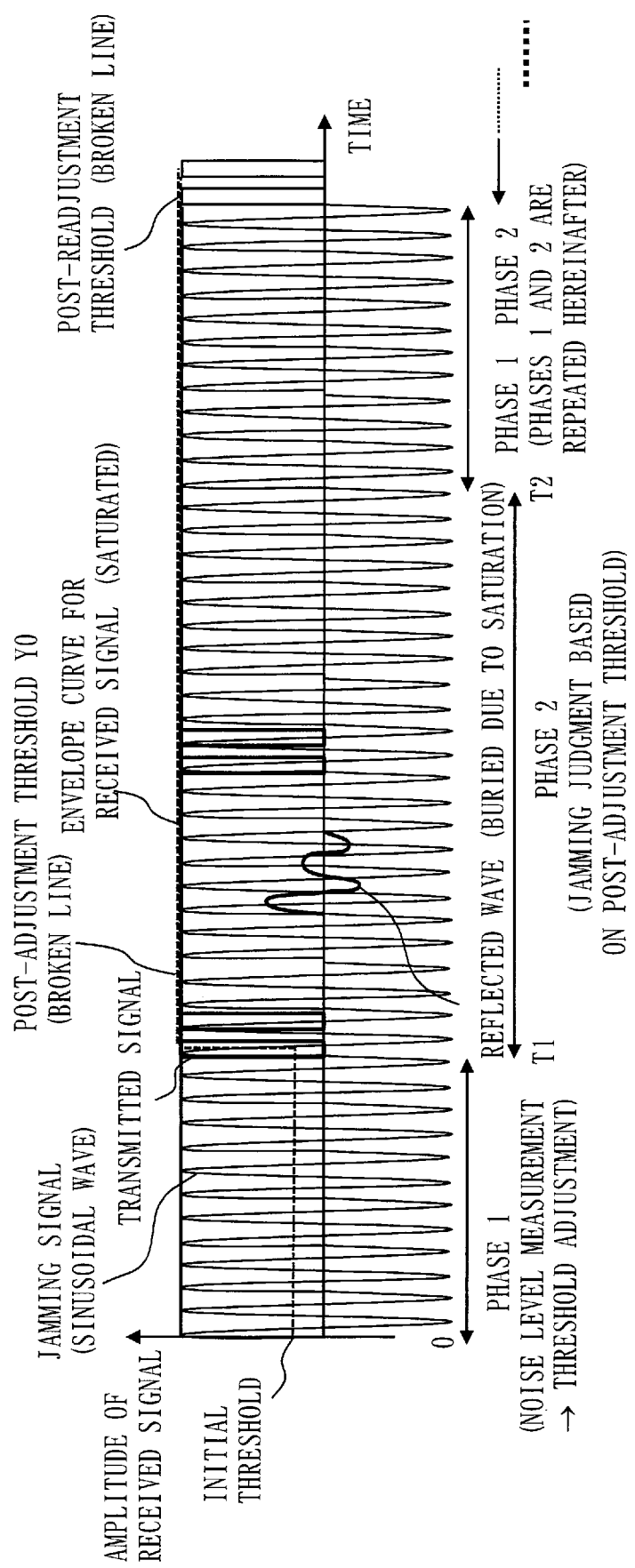
FIG. 9 is a chart for explaining received signals when a jamming attack is being made.

If a jamming attack is being made, as shown in FIG. 9, the reflected wave is buried in a jamming signal, and the received signals are saturated (clipped). For this reason, the envelope curve for the received signals has an almost constant value. The degree of fluctuation is low and is judged to be equal to or less than the reference value Y1.

If the noise level is stable at close values even under a normal environment without a jamming attack, the degree of fluctuation of the envelope curve for the received signals is low. For this reason, the degree of fluctuation is judged to be equal to or less than the reference value Y1.

(Step ST32: Second Judgment Process)

The disturbance judgment unit 115 judges whether an absolute value of "$|\mu-Y0|$" of a difference between the threshold Y0 and the average value $\mu$ for the envelope curve for the received signals calculated in step S31 is equal to or less than a reference value Y2.

If the absolute value of "$|\mu-Y0|$" of the difference is equal to or less than the reference value Y2, the disturbance judgment unit 115 advances the process to step ST34. On the other hand, if the absolute value of "$|\mu-Y0|$" of the difference is more than the reference value Y2, the disturbance judgment unit 115 advances the process to step ST35.

If a jamming signal is emitted for a fixed time period, as shown in FIG. 9, the average value $\mu$ for the envelope curve and the threshold Y0 have almost the same values. For this reason, $|\mu-Y0|\approx 0$ holds, and $|\mu-Y0|\leq Y2$ holds. Thus, if the degree of fluctuation is judged to be equal to or less than the reference value Y1 in step ST51, and the difference between the average value $\mu$ for the envelope curve and the threshold Y0 is equal to or less than the reference value Y2, the disturbance judgment unit 115 judges that a jamming attack is being made (step ST34).

If the noise level is low under a normal environment, the received signals are not saturated, and a peak of the reflected wave is not buried in noise. For this reason, even if the degree of fluctuation of the envelope curve is low, the average value $\mu$ for the envelope curve is larger than the threshold Y0 by an amount based on the peak of the reflected wave. Thus, $|\mu-Y0|>Y2$ holds. If the difference between the average value $\mu$ for the envelope curve and the threshold Y0 is more than the reference value Y2, the disturbance judgment unit 115 judges that no jamming attack is being made (step ST35).

(Step ST33: Third Judgment Process)

The disturbance judgment unit 115 judges whether fluctuation in the envelope curve for the received signals calculated in step ST31 is unnatural.

If the fluctuation in the envelope curve is unnatural, the disturbance judgment unit 115 advances the process to step ST34. On the other hand, if the fluctuation in the envelope curve is not unnatural, the disturbance judgment unit 115 advances the process to step ST35.

A definition of unnaturalness of the fluctuation in the envelope curve will be described.

Figure 10:
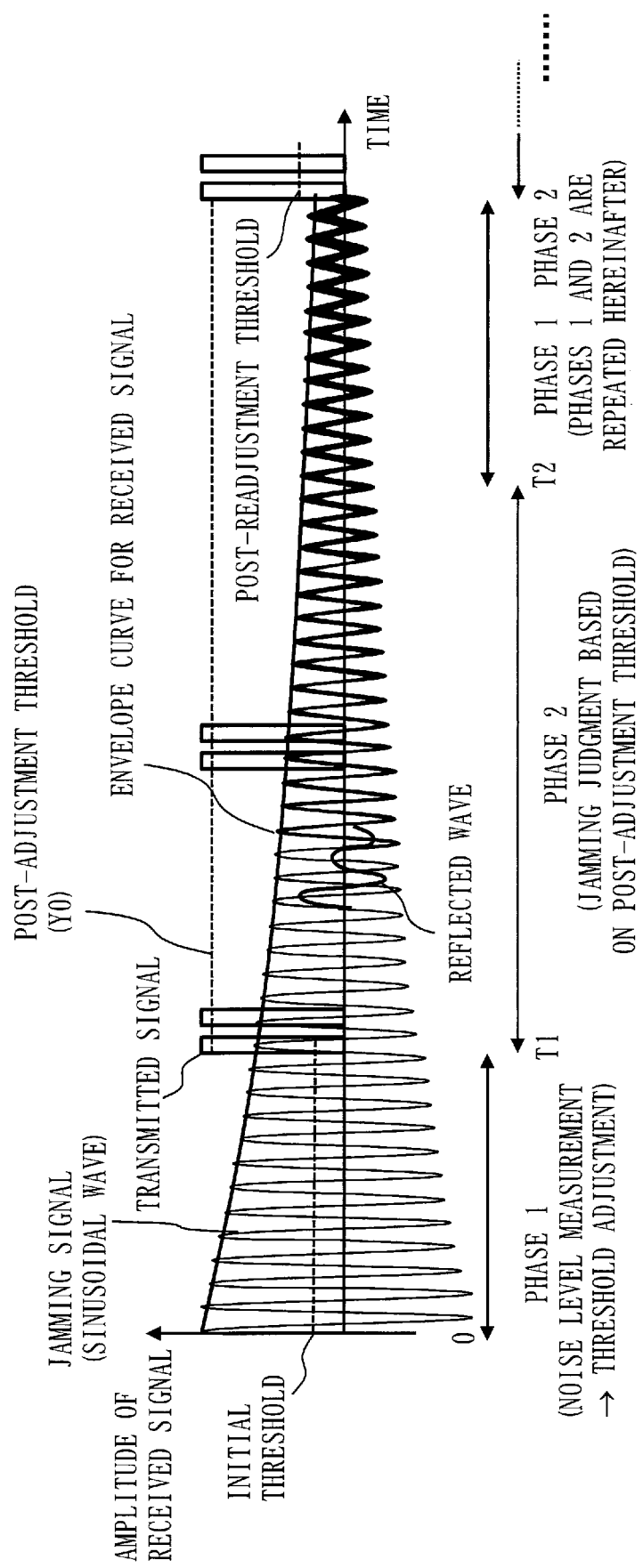
FIG. 10 is a chart for explaining received signals in a case where a jamming signal is emitted for a fixed time period, and a positional relationship between the disturbing signal source 30 and a mobile body 100 changes with time.

If a jamming signal is emitted for a fixed time period, and a positional relationship between the disturbing signal source 30 and the mobile body 100 changes with time, as shown in FIG. 10, the envelope curve for the received signals fluctuates continuously in amplitude in accordance with the positional relationship. More specifically, for example, if the disturbing signal source 30 is installed at the rear of a vehicle running in front of the mobile body 100, and the vehicle running in front is running at higher speed than the mobile body 100, a relative distance between the disturbing signal source 30 and the mobile body 100 increases monotonically, and the amplitude of the obtained envelope curve for the received signals decreases monotonically. In contrast, if the relative distance between the two decreases monotonically, the amplitude of the obtained envelope curve for the received signals increases monotonically. Note that, if the disturbing signal source 30 and the mobile body 100 become closer to each other by a fixed distance or more, the amplitude is saturated. It is extremely rare that the envelope curve for the received signals exhibits such fluctuation under a normal environment without a jamming attack.

That is, unnaturalness of the fluctuation in the envelope curve is that the envelope curve y(t) for the received signals decreases monotonically, increases monotonically, or is saturated for a fixed time period in accordance with the positional relationship between the disturbing signal source 30 and the mobile body 100.

The disturbance judgment unit 115 acquires the speed of the mobile body 100 from the speed sensor 25 via the in-vehicle interface 14 and the vehicle ECU 24 at the time of judging whether the fluctuation in the envelope curve is unnatural. The disturbance judgment unit 115 estimates a change in the positional relationship between the disturbing signal source 30 and the mobile body 100 using the acquired speed. Through this estimation, whether the envelope curve may exhibit a monotonic increase or a monotonic decrease can be judged.

Even if the degree of fluctuation is judged to be more than the reference value Y1 in step ST31, the disturbance judgment unit 115 judges that a jamming attack is being made (step ST34) if the fluctuation in the envelope curve is unnatural.

Figure 11:
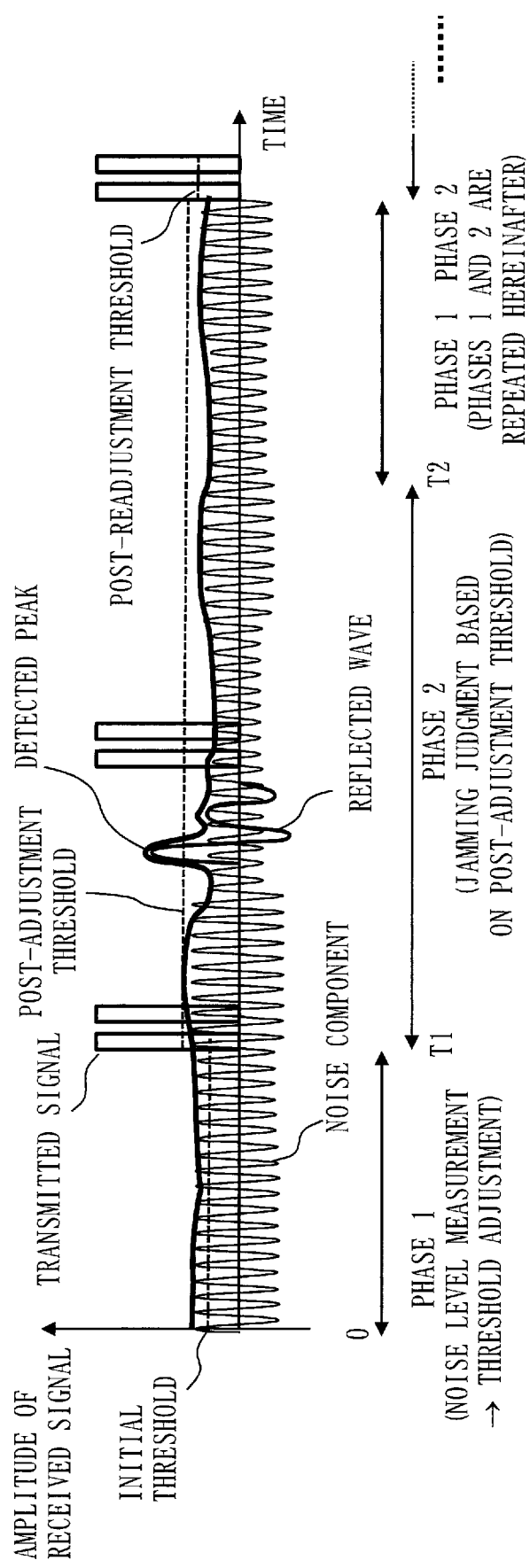
FIG. 11 is a chart for explaining received signals when no jamming attack is being made.

If fluctuation in the noise level is large under a normal environment, the envelope curve does not exhibit unnatural fluctuation even if the degree of fluctuation of the envelope curve is high. For this reason, if the fluctuation in the envelope curve is not unnatural, the disturbance judgment unit 115 judges that the cause of the high degree of fluctuation of the envelope curve is noise, as shown in FIG. 11, and that no jamming attack is being made (step ST35).

Figure 12:
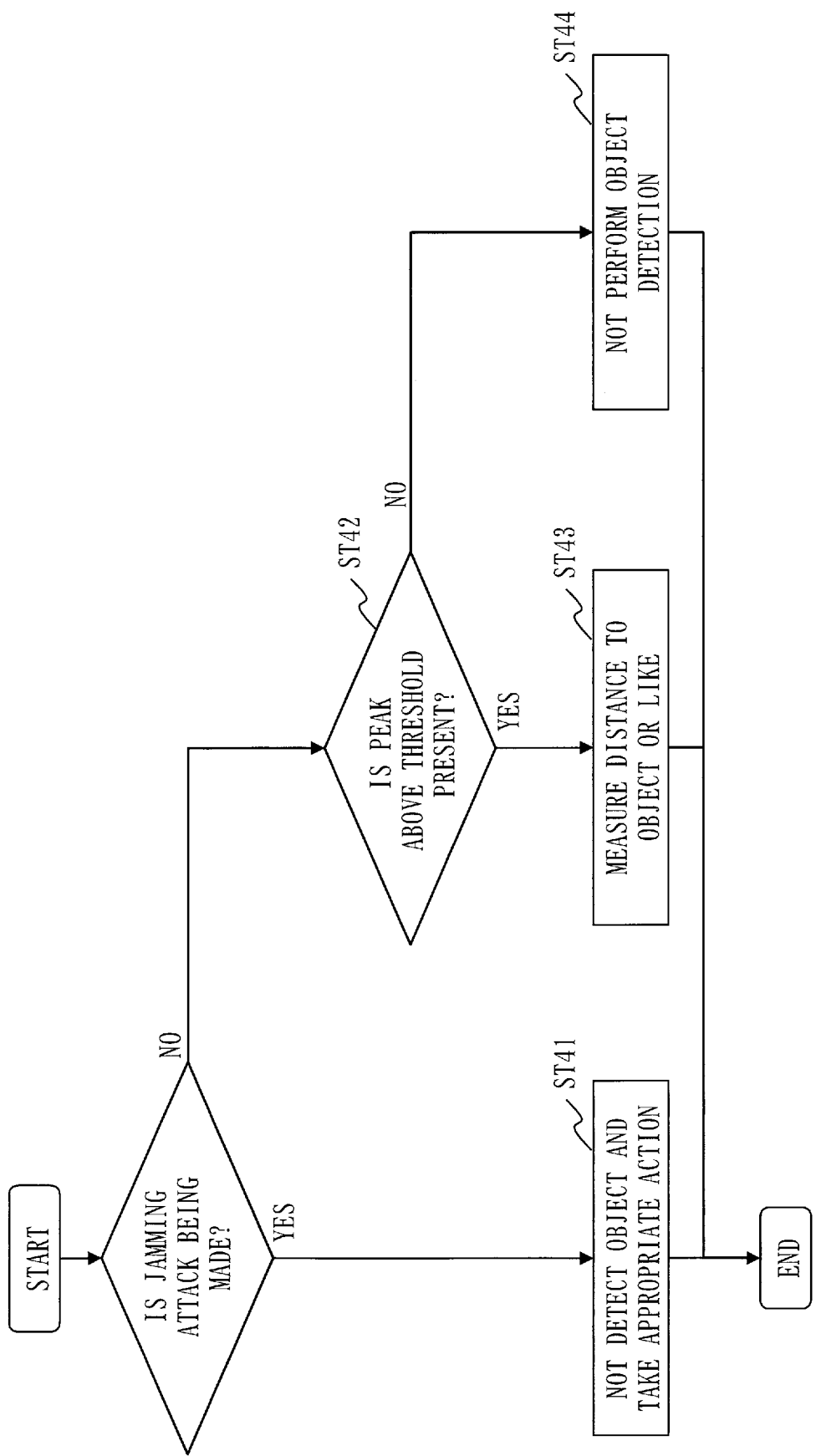
FIG. 12 is a flowchart showing operation of an object detection unit 116 according to Embodiment 1.

Operation of the object detection unit 116 according to Embodiment 1 will be described with reference to FIG. 12.

The operation of the object detection unit 116 corresponds to the processes in step ST23 to step ST24 of FIG. 3.

If a jamming attack is being made, a process in step ST41 is executed. The process in step ST41 corresponds to the process in step ST23 of FIG. 3. On the other hand, if no jamming attack is being made, processes in step ST42 to step ST44 are executed. The processes in step ST42 to step ST44 correspond to the process in step ST24 of FIG. 3.

Since the process in step ST41 is the same as the process in step ST23 of FIG. 3, a description thereof will be omitted.

(Step ST42: Peak Judgment Process)

The object detection unit 116 judges whether a peak above the threshold Y0 is present among the received signals output in step ST22.

If a peak above the threshold Y0 is present among the received signals, the object detection unit 116 advances the process to step ST43. On the other hand, if no peak above the threshold Y0 is present among the received signals, the object detection unit 116 advances the process to step ST44.

(Step ST43: Measurement Process)

The object detection unit 116 measures the distance to the object from a time period from the emission of the transmitted signal to reception of the received signal peak.

(Step ST44: Non-Measurement Process)

The object detection unit 116 does not perform object detection.

*Advantageous Effects of Embodiment 1*

As described above, the object detection apparatus 10 according to Embodiment 1 detects an object if it is judged that no jamming attack is being made and does not detect an object if it is judged that a jamming attack is being made. It is thus possible to prevent false detection due to a jamming signal and enhance the safety of the mobile body 100.

Additionally, the object detection apparatus 10 according to Embodiment 1 judges whether a jamming attack is being made, on the basis of a degree of fluctuation of an envelope curve for received signals and the threshold Y0 commensurate with noise level. It is thus possible to appropriately judge whether a jamming attack is being made.

\*\*\*Other Configurations\*\*\*

<Modification 1>

Figure 8:
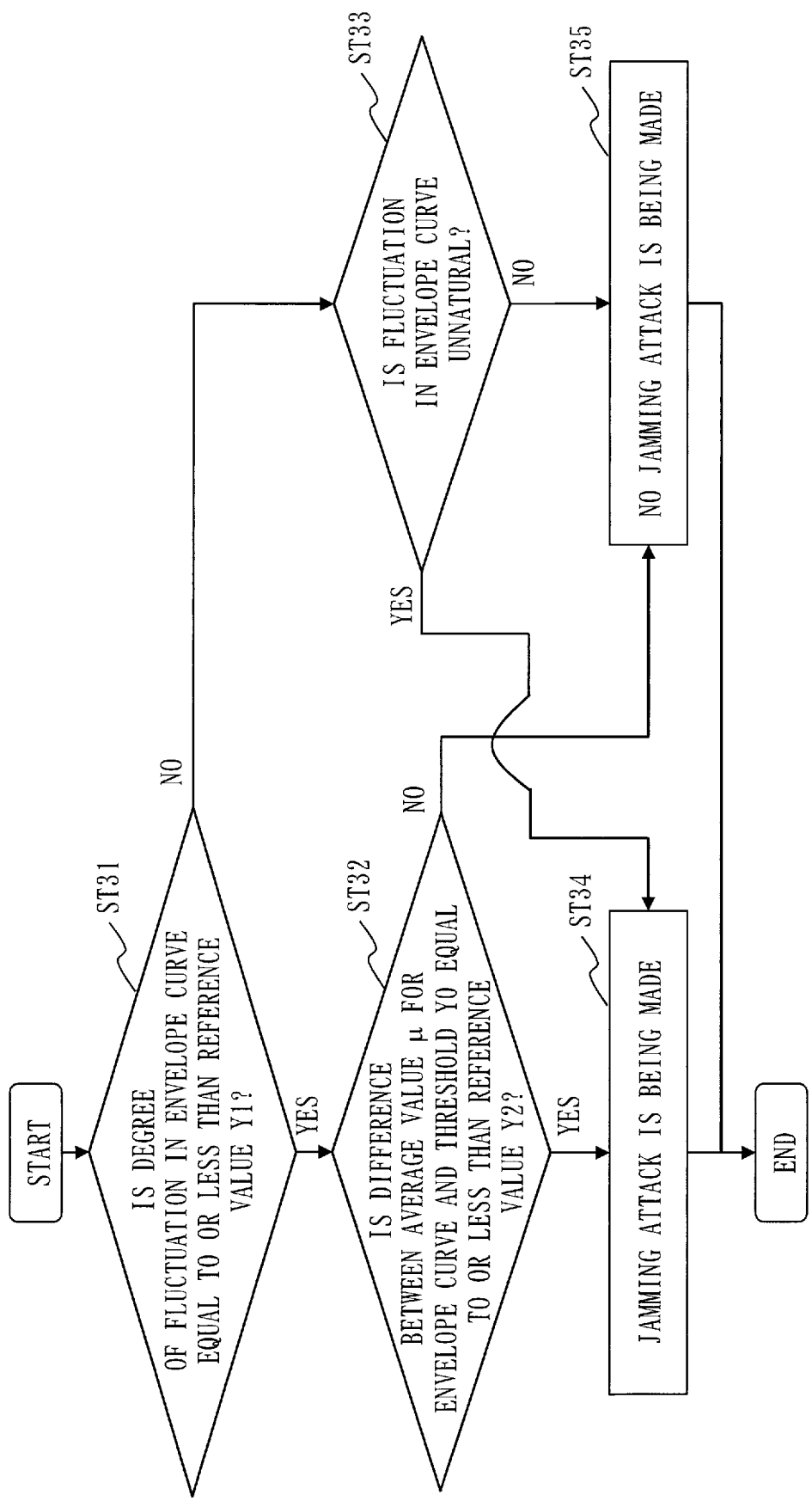
FIG. 8 is a flowchart showing operation of a disturbance judgment unit 115 according to Embodiment 1.

In Embodiment 1, in step ST33 of FIG. 8, the speed of the mobile body 100 is acquired from the speed sensor 25, and a change in the positional relationship between the disturbing signal source 30 and the mobile body 100 is estimated.

In Modification 1, the disturbance judgment unit 115 may estimate a change in a positional relationship between the disturbing signal source 30 and the mobile body 100, using sensors, such as a laser radar, a millimeter-wave radar, a camera, a far-infrared camera, and a GPS (Global Positioning System), mounted on the mobile body 100. Alternatively, the disturbance judgment unit 115 may acquire information indicating a position, a speed, and the like of an object by performing inter-vehicle communication with a vehicle in the surroundings of the mobile body 100 or performing road-to-vehicle communication with a roadside machine in the surroundings of the mobile body 100 and estimate a change in the positional relationship between the disturbing signal source 30 and the mobile body 100.

This allows high-accuracy estimation of the positional relationship.

<Modification 2>

In Embodiment 1, the functional components are implemented by software. In Modification 2, however, functional components may be implemented by hardware. Differences of Modification 2 from Embodiment 1 will be described.

Figure 13:
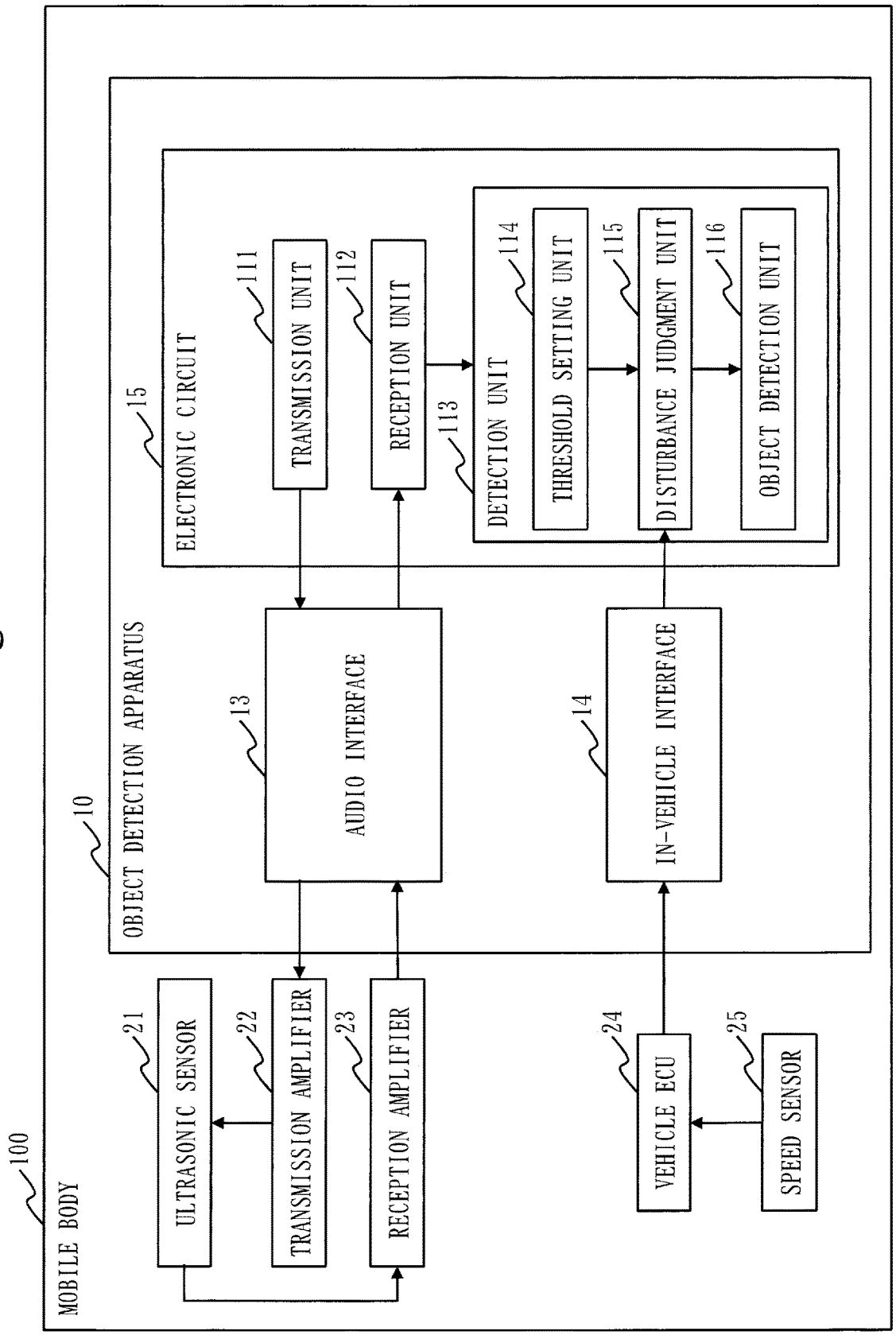
FIG. 13 is a diagram of a configuration of the object detection apparatus 10 according to Modification 2.

A configuration of the object detection apparatus 10 according to Modification 2 will be described with reference to FIG. 13.

If functional components are implemented by hardware, the object detection apparatus 10 includes an electronic circuit 15 instead of the processor 11 and the storage device 12. The electronic circuit 15 is a dedicated circuit which implements functions of the functional components and the storage device 12.

Possible examples of the electronic circuit 15 are a single circuit, a composite circuit, a programmed processor, a parallel-programmed processor, a logic IC, a GA (Gate Array), an ASIC (Application Specific Integrated Circuit), and an FPGA (Field-Programmable Gate Array).

The functional components may be implemented by one electronic circuit 15 or the functional components may be implemented by being distributed among a plurality of electronic circuits 15.

<Modification 3>

In Modification 3, one or ones of functional components may be implemented by hardware, and the other functional components may be implemented by software.

The processor 11, the storage device 12, and an electronic circuit 15 are generically referred to as processing circuitry. That is, functions of the functional components are implemented by the processing circuitry.

Embodiment 2

Embodiment 2 is different from Embodiment 1 in that noise level is calculated using a reception apparatus different from the ultrasonic sensor 21. The difference will be described in Embodiment 2, and a description of common points will be omitted.

\*\*\*Description of Configuration\*\*\*

Figure 14:
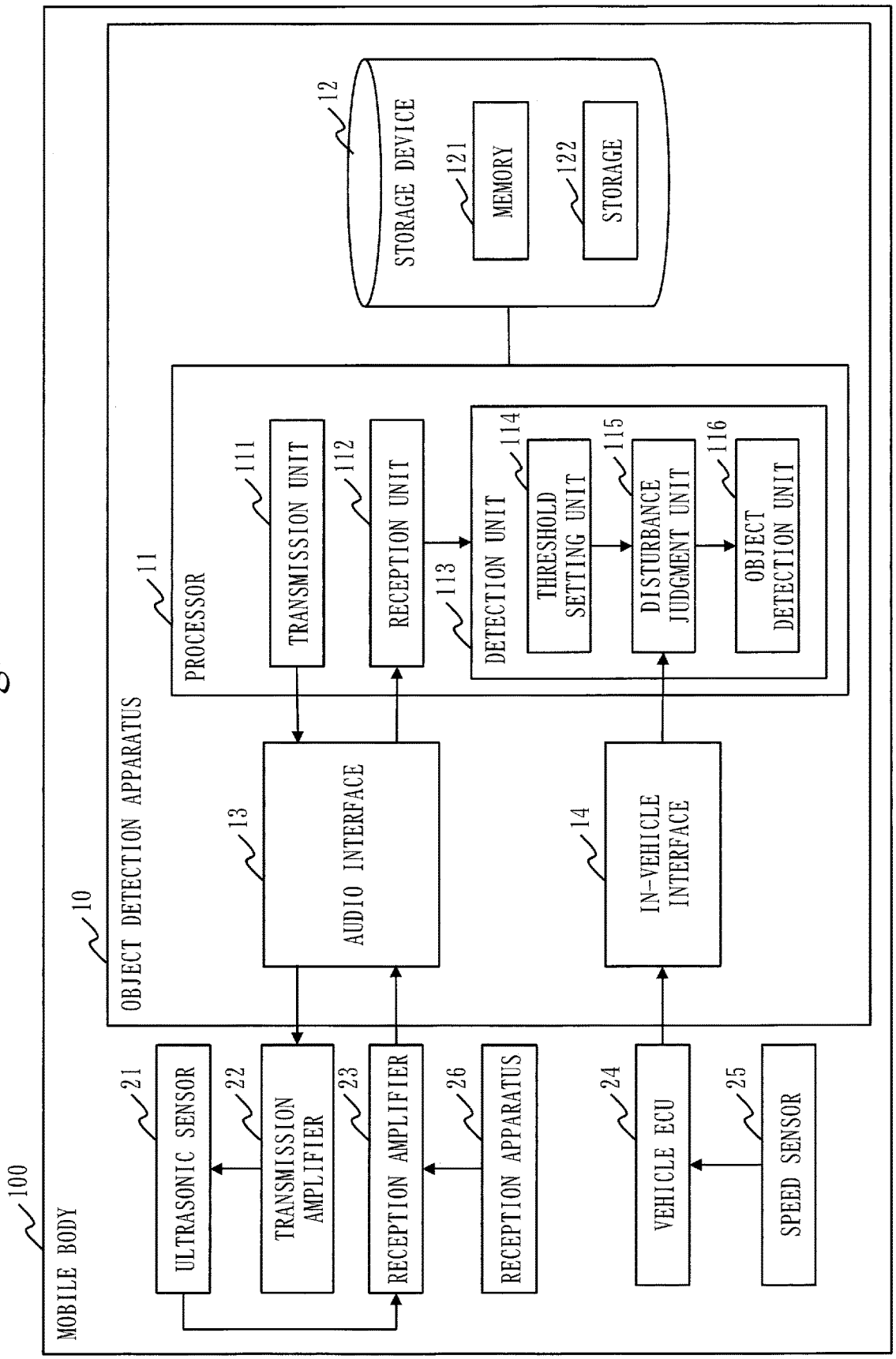
FIG. 14 is a diagram of a configuration of an object detection apparatus 10 according to Embodiment 2.

A configuration of an object detection apparatus 10 according to Embodiment 2 will be described with reference to FIG. 14.

The object detection apparatus 10 is different from the object detection apparatus 10 shown in FIG. 1 in that the object detection apparatus 10 includes a reception apparatus 26. The reception apparatus 26 is installed on a surface, in a mobile body 100, that is the same as or in proximity to a surface on which an ultrasonic sensor 21 is installed. A concrete example of the reception apparatus 26 is an ultrasonic sensor or a microphone.

\*\*\*Description of Operation\*\*\*

Operation of the object detection apparatus 10 according to Embodiment 2 will be described with reference to FIG. 2.

A process in step ST11 is the same as in Embodiment 1, and a description thereof will be omitted. A detection process in step ST13 will be described later.

(Step ST12: Reception Process)

A reception unit 112 receives a received signal with the ultrasonic sensor 21 (a reception apparatus Y), as in Embodiment 1. The reception unit 112 also receives a received signal with the reception apparatus 26 (a reception apparatus X). The reception unit 112 writes the received signal received by the ultrasonic sensor 21 and the received signal received by the reception apparatus 26 to a memory 121.

When received signals for a reference time period are accumulated in the memory 121, the reception unit 112 outputs the accumulated received signals to a detection unit 113. At this time, the reception unit 112 outputs received signals received by the ultrasonic sensor 21 and received signals received by the reception apparatus 26 to the detection unit 113.

Operation (the process in step ST13) of the detection unit 113 according to Embodiment 2 will be described with reference to FIG. 3.

In Embodiment 1, each block is composed of phase 1 and phase 2, as shown in FIGS. 4 and 5. In Embodiment 2, each block is composed only of phase 2.

(Step ST21: Threshold Setting Process)

A threshold setting unit 114 calculates received signal noise level using received signals received in last phase 2 by the reception apparatus 26 among the received signals output in step ST12. The threshold setting unit 114 sets a threshold Y0 in accordance with the calculated noise level. The threshold setting unit 114 outputs the set threshold Y0 to a disturbance judgment unit 115.

Processes in step ST22 to step ST24 are the same as those in Embodiment 1.

\*\*\*Advantageous Effects of Embodiment 2\*\*\*

As described above, the object detection apparatus 10 according to Embodiment 2 uses the reception apparatus 26 provided separately from the ultrasonic sensor 21 to calculate the noise level. The use eliminates the need to spare time for phase 1. As a result, jamming attack judgment can always be performed in a state in phase 2, and the immediacy of the judgment can be enhanced.

Embodiment 3

Embodiment 3 is different from Embodiments 1 and 2 in that Embodiment 3 prevents erroneous judgment as a jamming attack due to a failure of an ultrasonic sensor 21. The difference will be described in Embodiment 3, and a description of common points will be omitted.

Although a case where a function is added to Embodiment 1 will be described here, a function can also be added to Embodiment 2.

*Description of Configuration*

Figure 15:
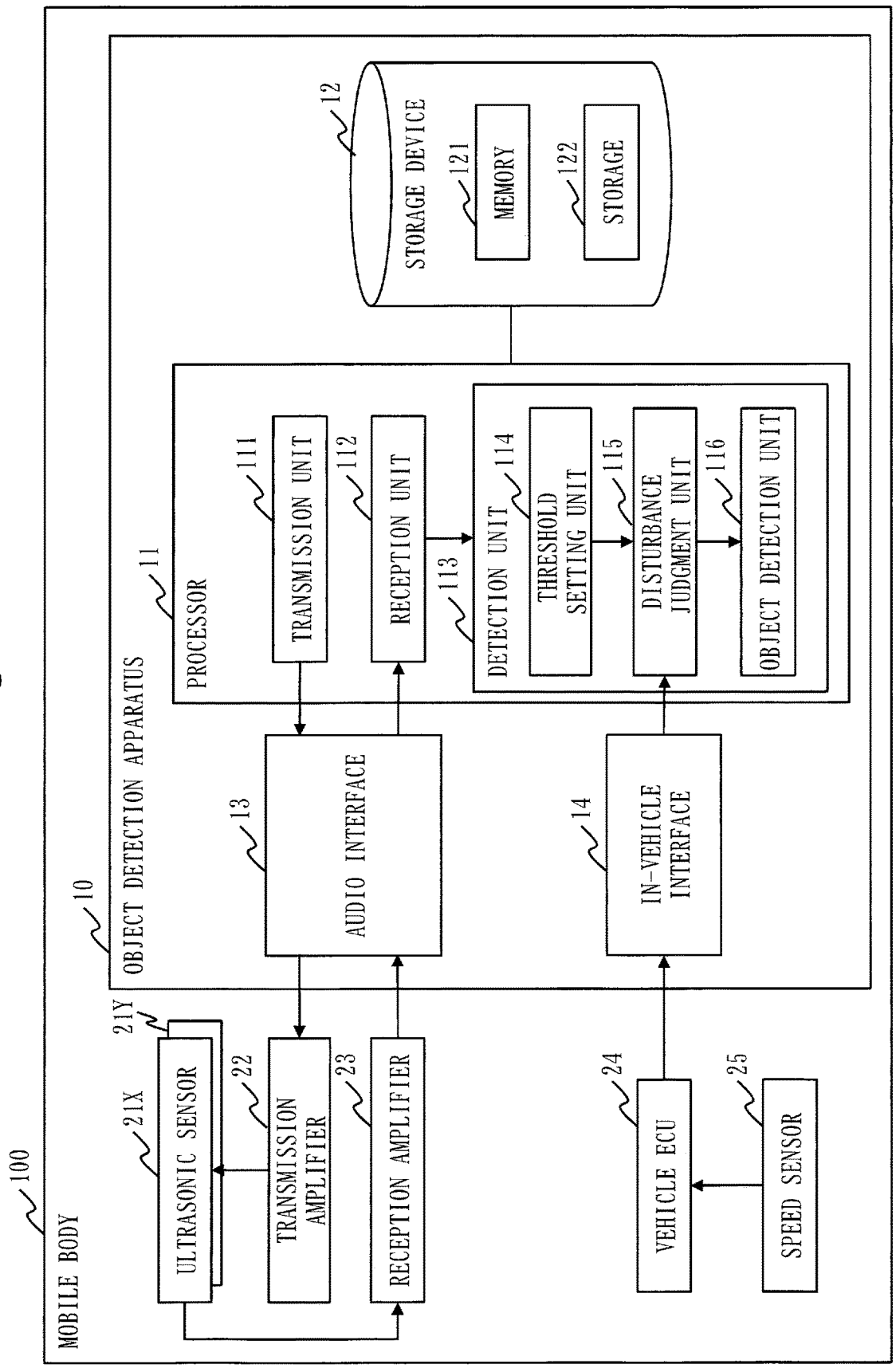
FIG. 15 is a diagram of a configuration of an object detection apparatus 10 according to Embodiment 3.

A configuration of an object detection apparatus 10 according to Embodiment 3 will be described with reference to FIG. 15.

The object detection apparatus 10 is different from the object detection apparatus 10 shown in FIG. 1 in that the object detection apparatus 10 includes an ultrasonic sensor 21X (a reception apparatus X) and an ultrasonic sensor 21Y (a reception apparatus Y) as the ultrasonic sensors 21. The ultrasonic sensor 21X and the ultrasonic sensor 21Y are installed on the same surface or close surfaces in a mobile body 100. The ultrasonic sensor 21X and the ultrasonic sensor 21Y use equivalent frequency bands.

*Description of Operation*

Operation of the object detection apparatus 10 according to Embodiment 3 will be described with reference to FIG. 2.

A detection process in step ST13 will be described later.

(Step ST11: Emission Process)

A transmission unit 111 regards a pulse signal as a transmitted signal and emits a transmitted signal as an acoustic signal at even intervals from the ultrasonic sensor 21X and the ultrasonic sensor 21Y via a transmission amplifier 22.

(Step ST12: Reception Process)

A reception unit 112 receives received signals with the ultrasonic sensor 21X and the ultrasonic sensor 21Y via a reception amplifier 23. The reception unit 112 writes a received signal (a first received signal) received by the ultrasonic sensor 21X and a received signal (a second received signal) received by the ultrasonic sensor 21Y to a memory 121.

When received signals for a reference time period are accumulated in the memory 121, the reception unit 112 outputs the accumulated received signals to a detection unit 113. At this time, the reception unit 112 outputs received signals received by the ultrasonic sensor 21X and received signals received by the ultrasonic sensor 21Y to the detection unit 113.

Operation (the process in step ST13) of the detection unit 113 according to Embodiment 3 will be described with reference to FIG. 3.

(Step ST21: Threshold Setting Process)

A threshold setting unit 114 calculates noise level X using received signals received in phase 1 among the received signals received by the ultrasonic sensor 21X. The threshold setting unit 114 also calculates noise level Y using the received signals received in phase 1 among the received signals received by the ultrasonic sensor 21Y.

The threshold setting unit 114 sets a threshold Y0X in accordance with the calculated noise level X and sets a threshold Y0Y in accordance with the calculated noise level Y. The threshold setting unit 114 outputs the set threshold Y0X and threshold Y0Y to a disturbance judgment unit 115.

(Step ST22: Disturbance Judgment Process)

The disturbance judgment unit 115 judges whether a jamming signal is being transmitted from outside, on the basis of received signals received in phase 2 among the received signals received by the ultrasonic sensor 21X, the threshold Y0X, and the speed of the mobile body 100. The disturbance judgment unit 115 judges whether a jamming signal is being transmitted from outside, on the basis of received signals received in phase 2 among the received signals received by the ultrasonic sensor 21Y, the threshold Y0Y, and the speed of the mobile body 100.

If it is judged in both cases that a jamming signal is being transmitted, the disturbance judgment unit 115 judges that a jamming attack is being made. If it is judged in both cases that no jamming signal is being transmitted, the disturbance judgment unit 115 judges that no jamming attack is being made. If it is judged in only either one case that a jamming signal is being transmitted, the disturbance judgment unit 115 judges that the ultrasonic sensor 21 has a malfunction or a failure. In this case as well, the disturbance judgment unit 115 judges that no jamming attack is being made.

The disturbance judgment unit 115 outputs a judgment result, the received signals received by the ultrasonic sensor 21X and the ultrasonic sensor 21Y, and the threshold Y0 to an object detection unit 116.

If a jamming attack is being made, the disturbance judgment unit 115 advances the process to step ST23. On the other hand, if no jamming attack is being made, the disturbance judgment unit 115 advances the process to step ST24.

*Advantageous Effects of Embodiment 3*

As described above, the object detection apparatus 10 according to Embodiment 3 judges, using a plurality of ultrasonic sensors 21, whether a jamming attack is being made. It is thus possible to know that a given ultrasonic sensor 21 has a failure and that it is erroneously judged that a jamming attack is being made.

For example, it is conceivable that the ultrasonic sensor 21X has a failure and it continues to be erroneously judged that a jamming attack is being made. In this case, if only the ultrasonic sensor 21X is provided, object detection is not performed. However, if the ultrasonic sensor 21Y is also provided, object detection is continued.

<Modification 4>

In Embodiment 3, it is judged that a jamming attack is being made if it is judged, for both received signals received by the ultrasonic sensor 21X and received signals received by the ultrasonic sensor 21Y, that a jamming signal is being transmitted. However, a jamming attack is highly unlikely to last long. For this reason, if it continues to be judged for a fixed time period or longer that a jamming attack is being made, it may be judged that the ultrasonic sensor 21X and the ultrasonic sensor 21Y each have a failure.

<Modification 5>

In Embodiment 3, two ultrasonic sensors 21 are used. However, three or more ultrasonic sensors 21 may be used. In this case, if it is judged that a jamming signal is being transmitted, on the basis of received signals received by a fixed number or more of ultrasonic sensors 21, it may be judged that a jamming attack is being made.

REFERENCE SIGNS LIST

10: object detection apparatus; 11: processor; 12: storage device; 13: audio interface; 14: in-vehicle interface; 15: electronic circuit; 111: transmission unit; 112: reception unit; 113: detection unit; 114: threshold setting unit; 115: disturbance judgment unit; 116: object detection unit; 21: ultrasonic sensor; 22: transmission amplifier; 23: reception amplifier; 24: vehicle ECU; 25: speed sensor; 26: reception apparatus; 30: disturbing signal source; 100: mobile body

The invention claimed is:

1. An object detection apparatus comprising:
processing circuitry to:
receive, with a reception apparatus provided in a mobile body, received signals including a reflected wave obtained when an acoustic signal emitted from the mobile body is reflected by an object;
judge whether a jamming attack in which a jamming signal is transmitted from outside is being made, on the basis of whether a degree of fluctuation of an envelope curve for the received signals is equal to or less than a reference value Y1; and detect an object in surroundings of the mobile body on the basis of the received signals if it is judged that no jamming attack is being made.

2. The object detection apparatus according to claim 1, wherein the degree of fluctuation is a variance for the envelope curve.

3. The object detection apparatus according to claim 1, wherein the processing circuitry calculates noise level on the basis of the received signals and sets a threshold in accordance with the calculated noise level, and judges whether the jamming attack is being made, on the basis of whether a difference between the threshold that has been set and an average value μ for the envelope curve for the received signals is equal to or less than a reference value Y2.

4. The object detection apparatus according to claim 3, wherein the processing circuitry calculates the noise level oil the basis of the received signals received in a first phase, and judges whether a difference between the threshold and an average value μ for an envelope, curve for the received signals received in a second phase that is a time slot different from the first phase is equal to or less than the reference value Y2.

5. The object detection apparatus according to claim 3, comprising:

a reception apparatus X and a reception apparatus Y as the reception apparatus, wherein the processing circuitry calculates the noise level on the basis of the received signals received using the reception apparatus X, and judges whether a difference between the threshold and an average value μ for an envelope curve for the received signals received using the reception apparatus Y is equal to or less than the reference value Y2.

6. The object detection apparatus according to claim 1, wherein the processing circuitry judges whether the jamming attack is being made, on the basis of fluctuation in the envelope curve for the received signals with a change in a relative position between the mobile body and the object in the surroundings of the mobile body.

7. The object detection apparatus according to claim 6, wherein the processing circuitry judges whether the jamming attack is being made, on the basis of whether an amplitude of the envelope curve enters one of a monotonically increasing state, a monotonically decreasing state, and a saturated state with the change in the relative position.

8. The object detection apparatus according to claim 1, comprising:

a reception apparatus X and a reception apparatus Y as the reception, apparatus, wherein the processing circuitry judges that the jamming attack is being made if it is judged that the jamming signal is being transmitted, on the basis of first received signals that are the received signals received by the reception apparatus X, and it is judged that the jamming signal is being transmitted, on the basis of second received signals that are the received signals received by the reception apparatus Y.

9. An object detection method comprising:

receiving received signals including a reflected wave obtained when an acoustic signal emitted from a mobile body is reflected by an object;

judging whether a jamming attack in which a jamming signal is transmitted from outside is being made, on the basis of whether a degree of fluctuation of an envelope curve for the received signals received is equal to or less than a reference value Y1; and detecting an object in surroundings of the mobile body on the basis of the received signals if it is judged that no jamming attack is being made.

10. A non-transitory computer readable medium storing an object detection program that causes a computer to execute:

a reception process of receiving received signals including a reflected wave obtained when an acoustic signal emitted from a mobile body is reflected by an object;

a disturbance judgment process of judging whether a jamming attack in which a jamming signal is transmitted from outside is being made, on the basis of whether a degree of fluctuation of an envelope curve for the received signals received in the reception process is equal to or less than a reference value Y1; and an object detection process of detecting an object in surroundings of the mobile body on the basis of the received signals if it is judged in the disturbance judgment process that no jamming attack is being made.

* * * * *